(12) United States Patent
Albertini et al.

(10) Patent No.: US 12,443,751 B2
(45) Date of Patent: Oct. 14, 2025

(54) ANONYMIZING TEXTUAL CONTENT IN IMAGE TRAINING DATA

(71) Applicant: ANYLINE GMBH, Vienna (AT)

(72) Inventors: Daniel Albertini, Vienna (AT); Martin Cerman, Vienna (AT); Michael Schwarz, Vienna (AT); Aniello Raffaele Patrone, Vienna (AT)

(73) Assignee: ANYLINE GMBH, Vienna (AT)

( * ) Notice: Subject to any disclaimer, the term of this patent is extended or adjusted under 35 U.S.C. 154(b) by 61 days.

(21) Appl. No.: 18/041,418

(22) PCT Filed: Aug. 13, 2021

(86) PCT No.: PCT/EP2021/072565
§ 371 (c)(1),
(2) Date: Feb. 13, 2023

(87) PCT Pub. No.: WO2022/034202
PCT Pub. Date: Feb. 17, 2022

(65) Prior Publication Data
US 2024/0028763 A1 Jan. 25, 2024

(30) Foreign Application Priority Data
Aug. 13, 2020 (EP) .................................... 20190903

(51) Int. Cl.
*G06F 21/62* (2013.01)
*G06F 40/166* (2020.01)
(Continued)

(52) U.S. Cl.
CPC ........ *G06F 21/6254* (2013.01); *G06F 40/166* (2020.01); *G06T 5/70* (2024.01); *G06V 40/161* (2022.01)

(58) Field of Classification Search
None
See application file for complete search history.

(56) References Cited

U.S. PATENT DOCUMENTS

| 2005/0248808 | A1 | 11/2005 | Ma et al. |
| 2014/0136941 | A1* | 5/2014 | Avrahami ........... G06F 21/6254 715/229 |

(Continued)

FOREIGN PATENT DOCUMENTS

| EP | 3 188 058 A1 | 7/2017 |
| EP | 3 451 209 A1 | 3/2019 |

(Continued)

OTHER PUBLICATIONS

Baek, Y. et al., "Character Region Awareness for Text Detection", arXiv:1904.01941 [cs.CV], Apr. 3, 2019.

(Continued)

*Primary Examiner* — Cai Y Chen
(74) *Attorney, Agent, or Firm* — Chrisman Gallo Tochtrop LLC (57) ABSTRACT

A computer-implemented method for modifying image data, the method including: loading unmodified image data; detecting at least two alphanumeric characters in an image represented by the loaded image data; selecting one or more of the detected alphanumeric characters, wherein the number of selected alphanumeric characters is smaller than the total number of detected alphanumeric characters; modifying the loaded image data by removing one or more character sections of the loaded image data, wherein each character section corresponds to an area of a selected alphanumeric character; storing the modified image data. Also provided is a corresponding data processing system, computer program product and computer-readable storage medium.

20 Claims, 7 Drawing Sheets

(51) Int. Cl.
G06T 5/70 (2024.01)
G06V 40/16 (2022.01)

(56) References Cited

U.S. PATENT DOCUMENTS

| | | | |
|---|---|---|---|
| 2014/0355069 | A1 | 12/2014 | Caton et al. |
| 2020/0065521 | A1 | 2/2020 | Durvasula et al. |
| 2020/0244626 | A1* | 7/2020 | Kwon ................. G06F 21/6218 |
| 2021/0248270 | A1 | 8/2021 | Durvasula et al. |

FOREIGN PATENT DOCUMENTS

| | | |
|---|---|---|
| EP | 3 614 291 A1 | 2/2020 |
| JP | 2002-149638 A | 5/2002 |
| JP | 2015-085533 A | 5/2015 |
| JP | 2015-222460 A | 12/2015 |

OTHER PUBLICATIONS

International Search Report and Written Opinion issued in corresponding application, PCT/EP2021/072565; Mailing date: Sep. 24, 2021.
Extended European Search Report issued in corresponding European application, EP 20 19 0903; Completion Date: Dec. 3, 2020.
Japanese Office Action for 2023-509740 dated Jun. 23, 2025.

* cited by examiner

ANONYMIZING TEXTUAL CONTENT IN IMAGE TRAINING DATA

CROSS-REFERENCE TO RELATED APPLICATIONS

This application is a U.S. National Stage entry of PCT/EP2021/072565, filed Aug. 13, 2021, which claims benefit of priority to European application 20190903.3, filed Aug. 13, 2020, the entire disclosures of which are hereby incorporated herein by reference.

FIELD OF THE INVENTION

The present invention concerns a computer-implemented method for modifying image data. more specifically, the invention concerns a computer-implemented method for removing sensitive personal information from image data. In particular, the invention concerns a computer-implemented method for generating, ideally distributable, training image data from given image data. The given image data may comprise sensitive personal information. Such training image data can be used to improve a system for content recognition. The present invention also concerns a corresponding data processing system, a corresponding computer program product, and a corresponding computer-readable storage medium.

BACKGROUND OF THE INVENTION

EP 3 188 058 A1 discloses a method and a system for analysing image data in medical images. The purpose of this method is to prevent recognition of facial features or faces in medical images of a facial skeleton or a head. The method is based on anonymization of sensitive regions, including features of eyes, nose, lips, forehead line, chin line and ears, which regions are automatically recognised. Anonymisation is achieved either irreversibly, with noise or reversibly, with geometric transformations. This method does not deal with sensitive textual personal information. In addition, this type of anonymisation renders the image data useless for training.

EP 3 451 209 A1 discloses an apparatus and method for anonymising image content. This method expressly seeks to maintain unprocessed the condition and/or feature. Anonymisation is achieved by replacing features or part of an image with a machine generated generic, but realistic looking, image part. This method is not specifically tailored to textual features and there is no workable disclosure to apply this method to image data comprising text. Moreover, the required machine generated replacement image parts render this method unsuitable for generating training data, because the generation requires prior training. In addition, the machine generated generic image parts would degrade the training effectiveness. The publication mentions only in the background section the prior art of anonymising vehicle registration plates by blurring. This renders the concerned image parts in its entirety useless for training. Specifically, it not only removes textual content, but also destroys structural information (e.g. concerning a document layout) in the image data.

US 2014/0136941 A1 concerns exclusively the processing of a computer-readable document. Said computer-readable document is searched for previously registered sensitive information, which is then made unrecognizable. It is explicitly not intended to make a category-based selection of the information. In any event, this publication does not concern or even mention character recognition in image data.

EP 3 614 291 A1 discloses "character shuffling" as one possibility for anonymizing character data. However, there is no connection with a preceding recognition of those characters in image data; consequently, the shuffling is not applied to image data representing characters.

US 2020/0244626 A1 mentions the possibility of blurring, but without any connection to a facial image, merely as a generic way to obscure image data. Also, this publication does not disclose or deal with a connection between character recognition in image data and the possibility that the recognized characters contain sensitive personal information.

BRIEF SUMMARY OF THE INVENTION

It is an object of the present invention, to transform training images containing sensitive written (or textual) personal information such that it is more difficult or impossible to trace the contained information back to an individual, while the image data can still be used e.g. for effective training of a system for optical character recognition.

The present invention proposes a computer-implemented method for modifying image data, the method comprising:
loading unmodified image data;
detecting at least two alphanumeric characters in an image represented by the loaded image data;
selecting one or more of the detected alphanumeric characters, wherein the number of selected alphanumeric characters is smaller than the total number of detected alphanumeric characters;
modifying the loaded image data by removing one or more character sections of the loaded image data, wherein each character section corresponds to an area of a selected alphanumeric character;
storing the modified image data.

The invention is based on the recognition that the individual characters of a sensitive written personal information do not themselves represent such sensitive information and are nevertheless useful for training a system for optical character recognition. Instead, it is the context (specifically, the preceding and/or subsequent characters) that is responsible for rendering any information "personal" and thus potentially sensitive. The information content of a single character is small enough to avoid traceability in any but a tiny group of individuals. Therefore, this information content can be left intact without reviewing sensitive personal information. The disclosed method aims at leaving at least one individual character in the image data unmodified by selecting a number of detected alphanumeric characters that is smaller than the total number. As a result, the modified image data can be used to effectively train a system for optical character recognition to improve its performance (i.e. improve or extend its recognition power) when applied to unmodified image data, while the unmodified image data itself does not need to be revealed in order to perform the training. While the modified image data provided by the present method can be readily used by systems based on machine learning, in particular comprising neural networks, such as system based on deep learning, the present method is useful irrespective of any particular implementation of the optical character recognition. For example, it may also be used to provide feedback to expert systems or other types of systems.

Optionally, the number of selected alphanumeric characters is more than 10%, in particular more than 30%, specifically more than 50% of all detected alphanumeric characters. Optionally, the number of selected alphanumeric characters is less than 90%, in particular less than 70%, specifically less than 60% of all detected alphanumeric characters. For example, the number of selected alphanumeric characters may be approximately half the number of all detected alphanumeric characters.

The disclosed method may include the steps of detecting at least one word comprising two or more alphanumeric characters in the image represented by the loaded image data, and selecting one or more of the detected alphanumeric characters of each detected word. Treating words individually and selecting one or more characters from each ensures that no word maintains its original content by coincidence.

In this context, a per-word-ratio of selected characters may be implemented by optionally selecting more than 10%, in particular more than 30%, specifically more than 50%, and/or less than 90%, in particular less than 70%, specifically less than 60%, of the detected alphanumeric characters of each word. For example, the disclosed method may include selecting approximately half the number of detected alphanumeric characters of each word.

In order to maintain more of the original structure of the image data, e.g. including a layout of a document represented by said image data, the disclosed method may include modifying the loaded image data by replacing at least one of the removed character sections of the loaded image data with a character section of the loaded image data corresponding to an area of an unselected alphanumeric character. In this way, the information content conveyed by the written parts of the unmodified image data is still largely destroyed. At the same time, the modified image data maintains general structural information such as the location and distribution of written information. Since the replacement sections originate from the same unmodified image data, general imaging properties, such as colours, lighting and contrast are reflected accurately throughout the modified image data. During replacement, the dimensions of the replacement sections may be adjusted to the dimensions of the replaced section.

According to another embodiment of the disclosed method, it may include modifying the loaded image data by replacing at least one of the removed character sections of the loaded image data belonging to the at least one word with a character section of the loaded image data corresponding to an area of an unselected alphanumeric character belonging to the same word as the removed character section. In this way, it is ensured, that replacement sections originate not only from the same unmodified image data, but also from the same word. This further improves an accurate reproduction of general imaging properties and also of the particular font and size of the characters, which are even more likely to match within the same word between the replacement section and the replaced section.

Optionally, the disclosed method may include modifying the loaded image data by shuffling one or more character sections of the loaded image data, wherein each character section corresponds to an area of an unselected alphanumeric character. In this instance, also the information conveyed by the position of the maintained characters is essentially destroyed. That further degrades the likelihood that any sensitive information can be reconstructed from the modified image data. This is particularly useful in cases where rare individual characters are detected and the total number of characters is relatively small. In such a case, the presence and position of the rare individual character may convey enough information to identify complete words (e.g. a name). Hence, within the scope of the present disclosure, the shuffling step described above may be carried out on-demand upon detection of a specific type of character, optionally combined with a lower limit on the total number of detected characters, below which shuffling is triggered.

According to an optional embodiment of the present method, shuffling of character sections corresponding to alphanumeric characters belonging to the at least one word may be limited to shuffling within the same word.

The present method may further optionally include detecting at least one face in an image represented by the loaded image data; and modifying the loaded image data by removing one or more portrait sections of the loaded image data, wherein each portrait section corresponds to an area of a detected face, and preferably replacing at least one removed portrait section with a blurred version of the same portrait section. This instance is particularly useful for application to image data comprising written information as well as facial information. Typical examples of such image data are images of identification documents, such as passports or IDs. In this instance and, similarly, in other instances described below, blurring parameters chosen such as to transform the section concerned irreversibly, i.e. into an irrecoverable state.

In this context, the present method may further include detecting at least one additional face in an image represented by the loaded image data using the at least one detected face as a template; and modifying the loaded image data by removing one or more additional portrait sections of the loaded image data, wherein each additional portrait section corresponds to an area of a detected additional face, and preferably replacing at least one additional portrait section with a blurred version of the same additional portrait section. An additional face may for example be a holographic version of a face, e.g. an identifiable holographic face. The use of the at least one detected face as a template allows to more reliably detect (partially represented) versions of the same face in the unmodified image data, e.g. even when essential features of the version are missing or image colour and/or contrast of the version are significantly degraded.

The present method may further optionally include detecting at least one written signature in an image represented by the loaded image data; and modifying the loaded image data by removing one or more signature sections of the loaded image data, wherein each signature section corresponds to an area of a detected written signature, and preferably replacing at least one removed signature section with a blurred version of the same signature section. This instance is particularly useful for application to image data comprising written information as well as signature information. Typical examples of such image data are images of legal documents, such as completed forms or contracts.

The present method may further optionally include detecting at least one machine-readable code in an image represented by the loaded image data; and modifying the loaded image data by removing one or more code sections of the loaded image data, wherein each code section corresponds to an area of a detected machine-readable code, and preferably replacing at least one removed code section with a blurred version of the same code section. This instance is particularly useful for application to image data comprising written information as well as a machine-readable code. Typical examples of such image data are images of labels for human and machine use, such as address labels comprising potentially sensitive personal information of the sender and/or recipient.

In order to solve the object mentioned in the outset, the present invention also proposes a data processing system comprising means for carrying out the method according to one or more of the variations disclosed above.

In order to solve the object mentioned in the outset, the present invention also proposes a computer program product comprising instructions which, when the program is executed by a computer, cause the computer to carry out the method according to one or more of the variations disclosed above.

Finally, in order to solve the object mentioned in the outset, the present invention also proposes a computer-readable storage medium comprising instructions which, when executed by a computer, cause the computer to carry out the method according to one or more of the variations disclosed above.

BRIEF DESCRIPTION OF THE DRAWINGS

Referring now to the drawings, wherein the figures are for purposes of illustrating the present disclosure and not for purposes of limiting the same, FIG. 1A schematically shows an unmodified image containing sensitive personal information.

DESCRIPTION OF EXAMPLE EMBODIMENTS

Figure 1A:
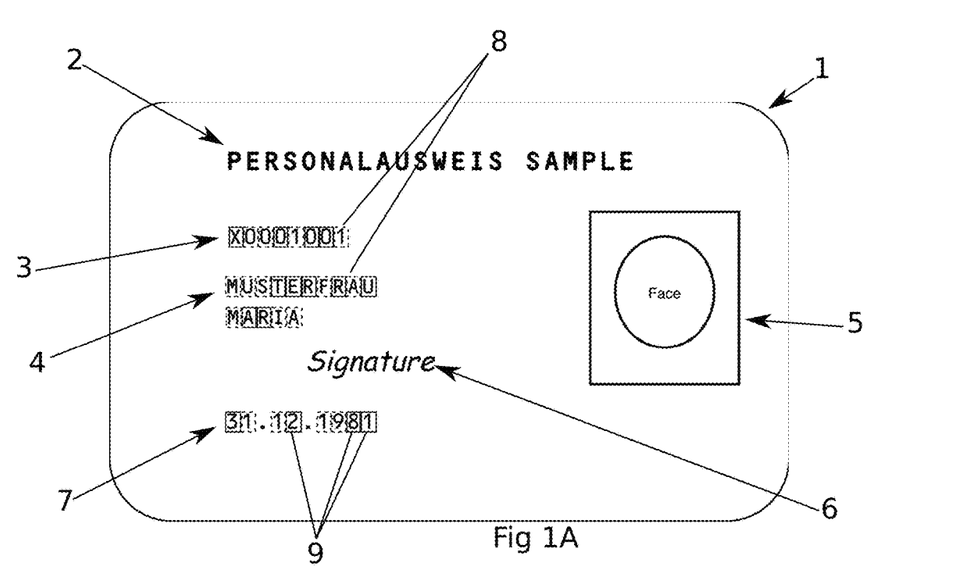

FIG. 1A shows an unmodified image 1 of a personal ID document. The personal ID document comprises an indication 2 of the document type, a document serial number 3, the name 4, portrait 5 (i.e. an image of a face of a person, e.g. a photograph), signature 6 and date of birth 7 of a person identified by the document. All of this information, except for the document type, are sensitive personal information. It is therefore not possible to freely share or distribute the image data representing the image 1.

In addition to the document content, FIG. 1A also indicates, which alphanumeric characters are detected and related to sensitive personal information. Each alphanumeric character is contained a corresponding character section 8, 9 of the image. There are two types of character sections 8, 9: selected character sections 8 are indicated as dashed boxes; and unselected character sections 9 are indicated as continuous boxes.

Figure 1B:
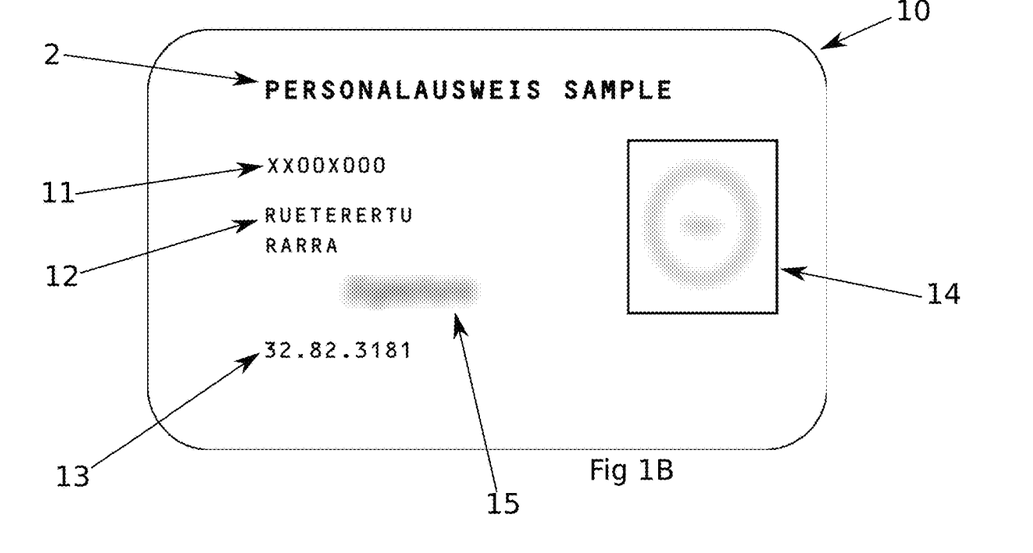
FIG. 1B schematically shows a modified image after processing according to the present method.

FIG. 1B shows a modified image 10 of the same personal ID document as FIG. 1A after modification according to the method described in detail below. The indication 2 of the document type remains unchanged. The written information, which comprises the document serial number 3, the name 4 and the date of birth 7, is replaced by anonymized versions of the document serial number 11, the name 12 and the date of birth 13. In detail, the image content of the selected character sections 8 (dashed boxes in FIG. 1A) has been replaced with copies of the image content of unselected character sections 9 (continuous boxes in FIG. 1A). The sections containing the portrait 5 and the signature 6 are replaced by blurred versions of the portrait 14 and the signature 15.

Figure 2:
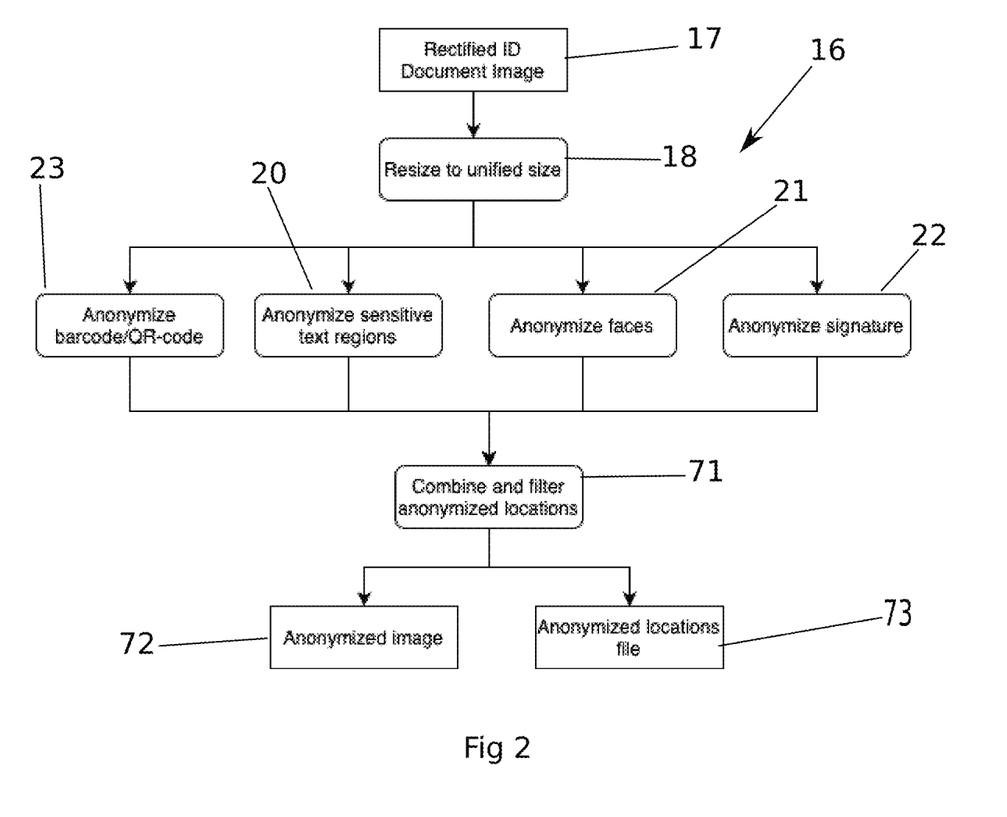
FIG. 2 schematically illustrates an overview of a computer-implemented method for modifying image data according to the present disclosure, involving different processes transforming the same unmodified image and combined to obtain modified image data.

FIG. 2 shows an overview flowchart of a computer-implemented method 16 for modifying image data. The method comprises: loading 17 unmodified image data (in this example, the image 1 of an ID document as shown in FIG. 1A, if necessary rectified to correct for skew and tilt); resizing 18 the unmodified image data to predefined dimensions to achieve a unified image size; and passing one copy of the image data 19 returned after resizing 19 to each of four parallel processing branches 20-23 described in more detail in connection with FIGS. 3 to 6.

Figure 3:
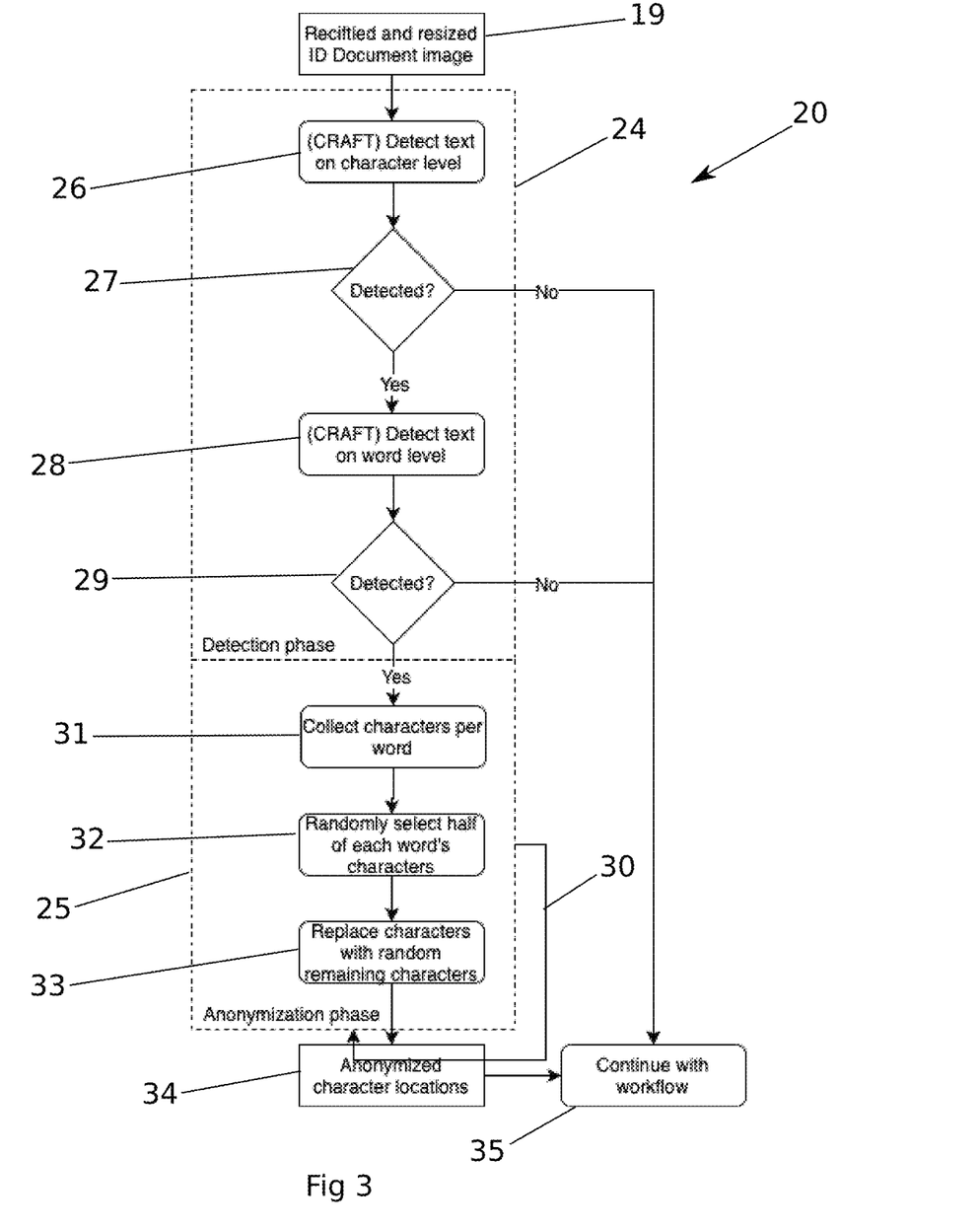
FIG. 3 schematically illustrates one of the processes indicated in FIG. 2, responsible for anonymising sensitive text regions.

FIG. 3 shows a detailed flowchart of the first branch 20 in FIG. 2. The method steps in the first branch 20 anonymize sensitive text regions in the image data 19. The first branch 20 comprises a detection phase 24 and a subsequent anonymization phase 25. The detection phase 24 comprises the following steps: detecting 26 at least two alphanumeric characters in an image represented by the image data 19; in response to determining 27 that at least two alphanumeric characters are detected, detecting 28 at least one word comprising two or more alphanumeric characters in the image represented by the image data 19; and determining 29 that at least one word is detected. For detecting the at least two alphanumeric characters, a robust approach may be used, such as the "CRAFT" method described by Baek, Youngmin, et al. in "Character region awareness for text detection." (Proceedings of the IEEE Conference on Computer Vision and Pattern Recognition. 2019.), an implementation of which can be accessed at https://github.com/clovaai/CRAFT-pytorch. In order to improve robustness (i.e. avoid that text regions remain undetected), the detection approach can be applied to different image scales and using different parameters to find individual characters. The same implementation can be used also for word detection. The character or word detection typically yields polygonal location information representing a particular region or area within the image. For example, each detected character may correspond to a rectangle indicating the region in the image data, which region comprises the optical representation of the character. Characters belonging to the same word may be identified and represented by a word rectangle (or generally polygon) enclosing the rectangles of all characters belonging to the respective word.

The anonymization phase 25 follows the detection phase 24 and comprises the following steps: in response to the determination 29 that at least one word is detected, repeating 30 for each word: determining 31 the characters associated with that word; randomly selecting 32 approximately half of the alphanumeric characters associated with that word; randomly determining 33 for each selected alphanumeric characters a replacement alphanumeric character from all unselected alphanumeric characters (continuous boxes in FIG. 1A) belonging to the same word as the selected character and modifying the image data by replacing the image data in a character section of each selected alphanumeric character (dashed boxes in FIG. 1A) with the image data in a character section of the corresponding replacement alphanumeric character; appending the character sections of all selected alphanumeric characters to a collection of anonymized character locations 34; continuing until all detected words are processed. After the anonymisation phase 25, the first branch 20 comprises the step of returning 35 the modified image data together with the collection of anonymized character locations 34. Upon returning 35 from the first branch 20, control flow continues in FIG. 2.

Optionally (not shown in FIG. 3), within the scope of the first branch 20, the anonymization phase 25 may further include the following steps: modifying the loaded image data by replacing the image data in a character section of each unselected alphanumeric character (continuous boxes in FIG. 1A) with the (unmodified) image data in a character section of a randomly chosen different unselected alphanumeric character from the same detected word as the replaced character section; appending the character sections of all unselected alphanumeric characters to the collection of anonymized character locations. This additionally achieves intra-word shuffling of the positions of the character sections of the image data, which remain in the modified image data.

Figure 4:
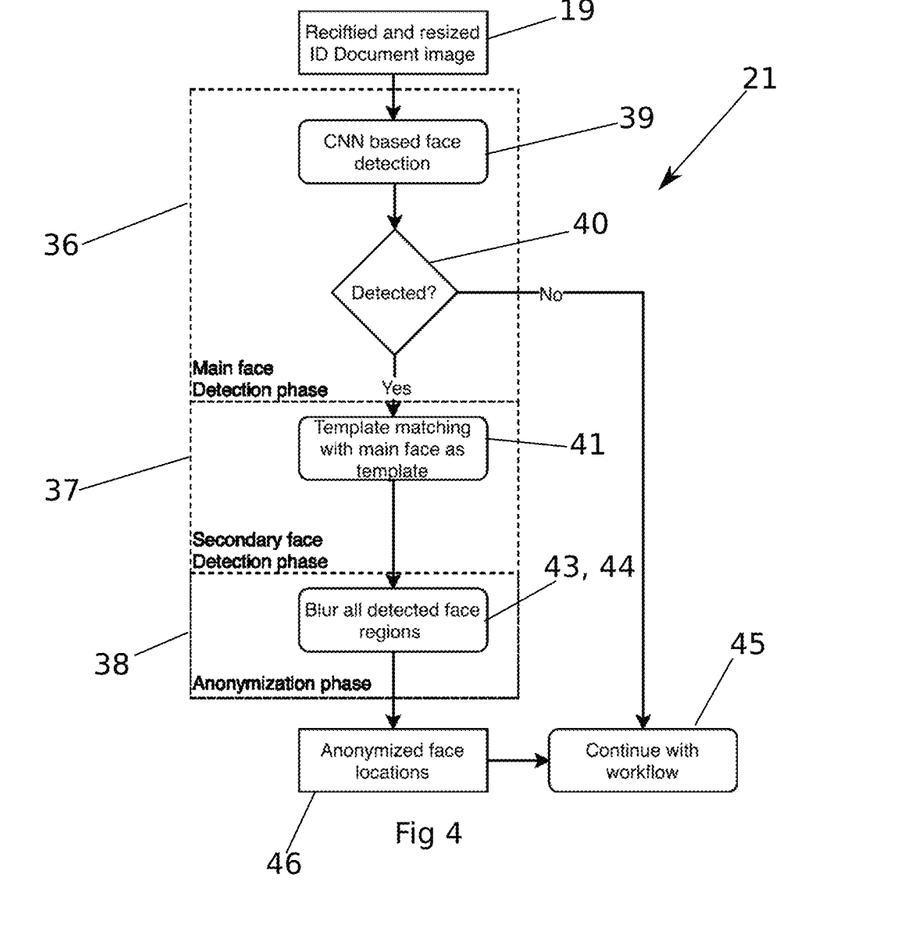
FIG. 4 schematically illustrates one of the processes indicated in FIG. 2, responsible for anonymising faces.

FIG. 4 shows a detailed flowchart of the second branch 21 in FIG. 2. The method steps in the second branch 21 anonymize face regions in the image data. The second branch 21 comprises a main face detection phase 36, a secondary face detection phase 37 and an anonymization phase 38. The main face detection phase 36 comprises the following steps: detecting 39 at least one face in an image represented by the image data 19; determining 40 that at least one face is detected. The secondary face detection phase 37 follows the main face detection phase 36 and comprises the following steps: in response to the determination 40 that at least one face is detected during the main face detection phase 36, detecting 41 any (zero or more) additional faces in an image represented by the image data 19 using the at least one face detected during the main face detection phase 36 as a template.

To implement a suitable face detection, for example the library accessible at https://github.com/ageitgey/face_recognition can be used and specifically the convolutional neural-network detection approach ("cnn") provided by that library. Optionally, image pyramid (scaling) parameters can be tuned to achieve desirable (i.e. robust) detection performance. Moreover, the secondary face detection may again be applied to different scales of the image data 19 to increase robustness. For template matching, an implementation provided by the OpenCV library (https://opencv.org/) may be used. The detection yields bounding boxes for each detected face and each detected additional face.

The anonymisation phase 38 follows the secondary face detection phase 37 and comprises the following steps: modifying 43 the image data 19 by removing one or more portrait sections of the image data, wherein each portrait section corresponds to an area of a detected face, and replacing at least one removed portrait section with a blurred version of the same portrait section; modifying 44 the image data by removing any additional portrait sections of the loaded image data, wherein each additional portrait section corresponds to an area of a detected additional face, and replacing any additional portrait section with a blurred version of the same additional portrait section. In other words, the bounding box of each portrait section and each additional portrait section is blurred with a filter kernel of appropriate size. After the anonymisation phase 38, the second branch 21 comprises the step of returning 45 the modified image data together with a collection of anonymized face locations 46 comprising the portrait sections and the additional portrait sections. Upon returning 45 from the second branch 21, control flow continues in FIG. 2.

Figure 5:
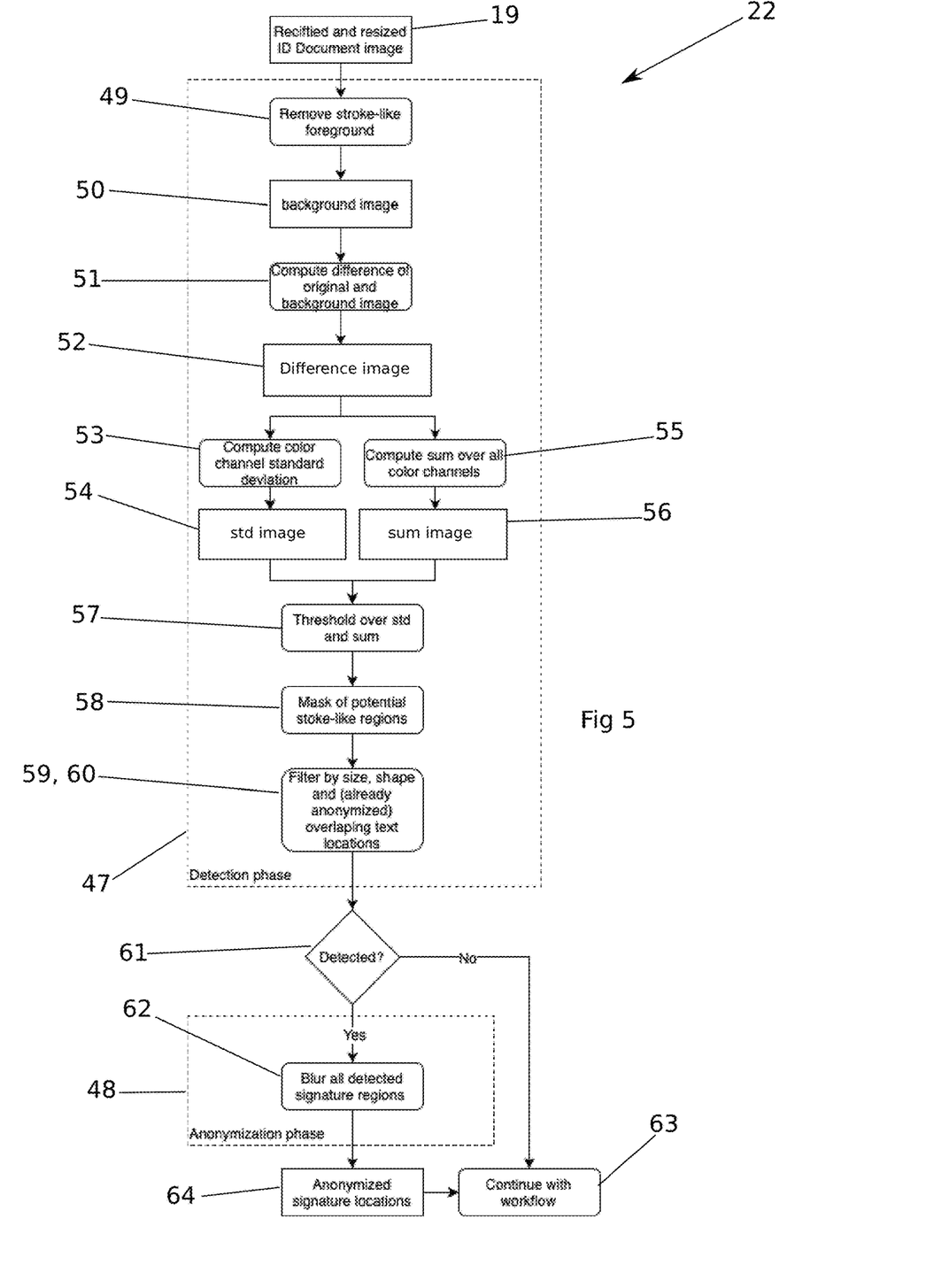
FIG. 5 schematically illustrates one of the processes indicated in FIG. 2, responsible for anonymising signatures.

FIG. 5 shows a detailed flowchart of the third branch 22 in FIG. 2. The method steps in the third branch 22 anonymise signatures in the image data. The third branch 22 comprises a detection phase 47 and an anonymisation phase 48. The detection phase 47 is responsible for detecting at least one written signature in an image represented by the image data 19. It comprises the following steps: removing 49 an image foreground (small stroke like structures like text or lines) of the image represented by the loaded image data by applying dilation and median blur on it to obtain a background image 50; computing 51 a difference of the unmodified image 19 and the determined background image 50 to obtain a difference image 52; processing the difference image 52 in two parallel sub-branches, wherein the first sub-branch comprises computing 53 a standard deviation ("std") over all colour channels to obtain a first monochrome image 54, and wherein the second sub-branch comprises computing 55 a sum over all colour channels to obtain a second monochrome image 56; applying noise reduction (morphological methods) and image filtering to the difference image 52; identifying 57 potential text like regions in the difference image by computing an image mask, which includes only such image regions, where the first monochrome image is within a first predefined threshold range and the second monochrome image is within a second predefined threshold range; computing 58 the contours of all identified potential text like regions; filtering 59 (i.e. skipping from further processing) those regions by contour features and prior knowledge, e.g. minimum and maximum area and/or shape boundaries (the signature will not be as wide as the entire ID card); comparing the contours of the remaining potential text like regions with previously identified text like regions that are already detected and anonymized and determining an intersection area; filtering 60 those regions with an intersection area above a predefined threshold; keeping the remaining potential text like regions as detected signature sections of the loaded image data, wherein each signature section corresponds to an area of a detected written signature. Similar to what is described in connection with the character detection and face detection above, detection parameters for the signature detection may be tuned in favour of robust anonymisation and accepting a varying number of false positives.

After the detection phase 47, the third branch 22 comprises: in response to determining 61 that at least one signature section is detected, proceeding with the anonymisation phase 48. The anonymisation phase 48 comprises the following steps: modifying 62 the image data 19 by removing one or more signature sections of the image data and replacing at least one removed signature section with a blurred version of the same signature section. More specifically, the bounding box of each signature section is blurred with a filter kernel of appropriate size. After the anonymisation phase 48, the third branch 22 comprises the step of returning 63 the modified image data together with a collection of anonymized signature locations 64 comprising the signature sections. Upon returning from the third branch 22, control flow continues in FIG. 2.

In the difference image 52 mentioned above, regions that were previously removed as image foreground are highlighted strongest. The signature detection explained above is based on the general recognition that, if the standard deviation over all colour channels is small and at the same time the sum over all colour channels is in a higher range, it is very likely that those regions are text like structures.

Figure 6:
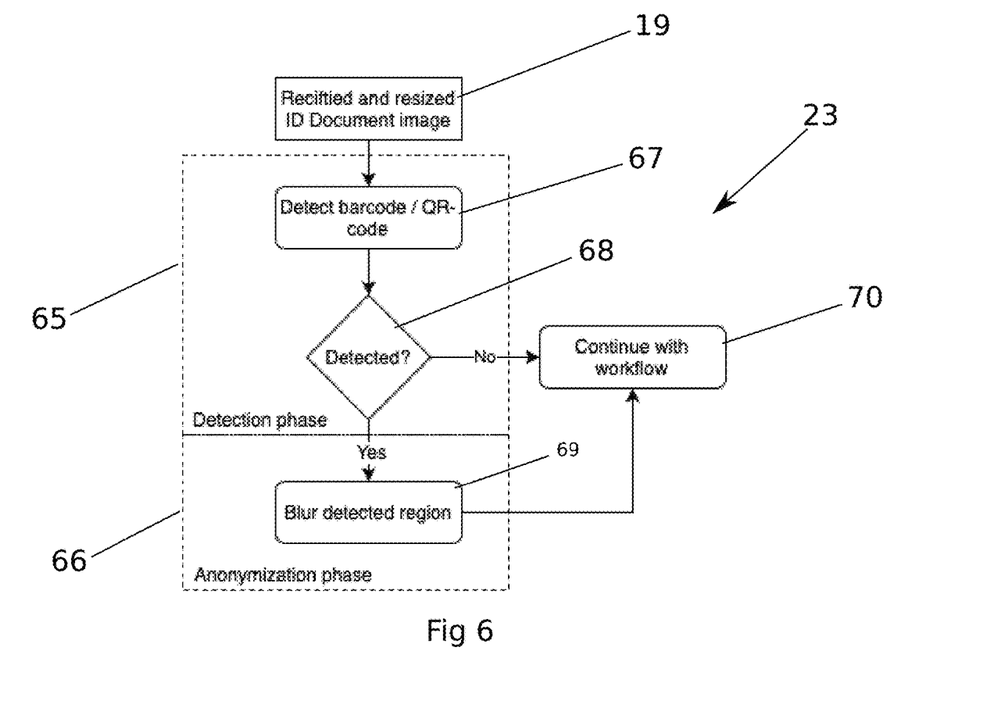
FIG. 6 schematically illustrates one of the processes indicated in FIG. 2, responsible for anonymising barcodes or quick response (QR) codes.

FIG. 6 shows a detailed flowchart of the fourth branch 23 in FIG. 2. The method steps in this fourth branch 23 anonymise barcodes or QR codes (or, generally, machine-readable codes). The fourth branch 23 comprises a detection phase 65 and an anonymisation phase 66. The detection phase 65 comprises the following steps: detecting 67 at least one machine-readable code in an image represented by the image data 19; determining 68 that the at least one machine-readable code is detected. One exemplary implementation providing a working detection of barcodes and QR codes is the "pyzbar" library accessible at https://pypi.org/project/pyzbar/.

The anonymisation phase 66 follows the detection phase 65 and comprises the following steps: in response to the determination 68 that at least one machine-readable code is detected during the detection phase 65, modifying 69 the image data 19 by removing one or more code sections of the image data, wherein each code section corresponds to an area of a detected machine-readable code, and replacing at least one removed code section with a blurred version of the same code section. In other words, the regions of the image data 19 detected as comprising a machine-readable code are being blurred. After the anonymisation phase 66, the fourth branch 23 comprises the step of returning 70 the modified image data. Upon returning from the fourth branch 23, control flow continues in FIG. 2.

In the example of the image 1 shown in FIG. 1A, there is no machine-readable code to be detected. Hence, the fourth branch returns directly from the determining 68 in the detection phase 65.

Continuing with respect to FIG. 2 after all branches 20-23 returned, the method continues with combining 71 the modified image data returned from each of the four branches 20-23 based on the anonymised character locations 34, the anonymised face locations 46 and the anonymised signature locations 64 returned from the first branch 20, second branch 21 and third branch 22 respectively and performing additional image transformation of overlapping sections. More in detail, the modified images returned from the branches are combined as follows: areas not overlapping with any of the anonymised locations are copied from the unmodified image; areas overlapping with only a single anonymised location are copied from the modified image returned by the same branch as the respective anonymised location; areas overlapping with an anonymised character location and a second anonymised location (i.e. face, signature or code) are copied from the modified image returned by the same branch as the respective second anonymised location; all other areas (i.e. overlapping with two or three anonymized face, signature or code locations) are merged by computing an average image from the modified images returned by each branch contributing an anonymised location to the overlapping anonymised locations. At the end of the method disclosed in FIG. 2, a modified image 72 is provided and stored, which is the anonymised image. In addition, a separate anonymised locations file 73 is provided and stored, which comprises information indicating all anonymised locations.

Figure 7:
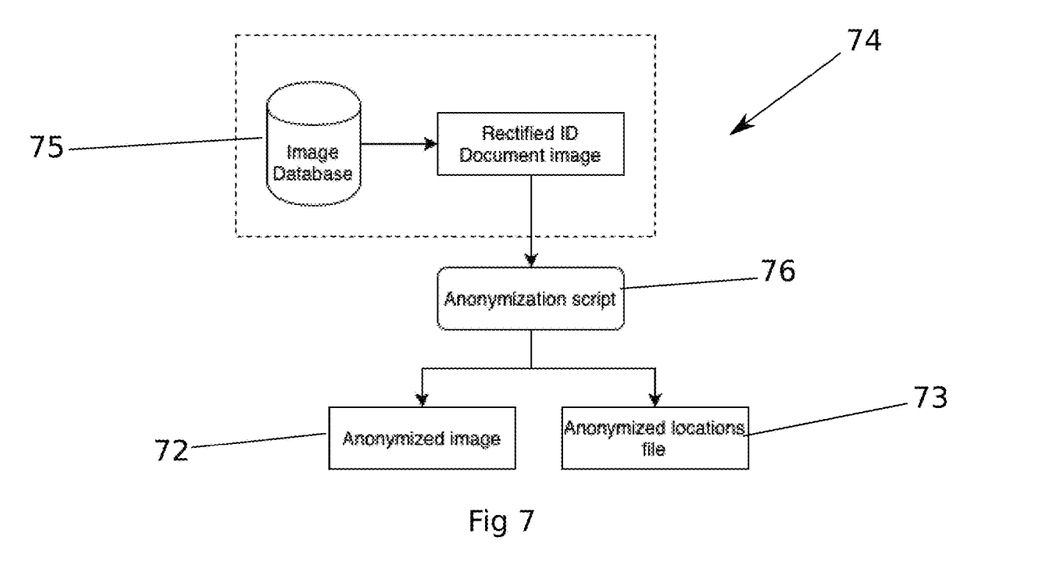
FIG. 7 schematically illustrates an application of the present method with a large number of unmodified images.

FIG. 7 shows a data processing system 74 comprising means for carrying out the method described in connection with FIGS. 2 to 6. Specifically, the system 74 comprises an image database 75, from which unmodified image data can be loaded, and data processing means 76 for carrying out the method and storing for each unmodified image and anonymised image 72 and an anonymised locations file 73.

Figure 8A:
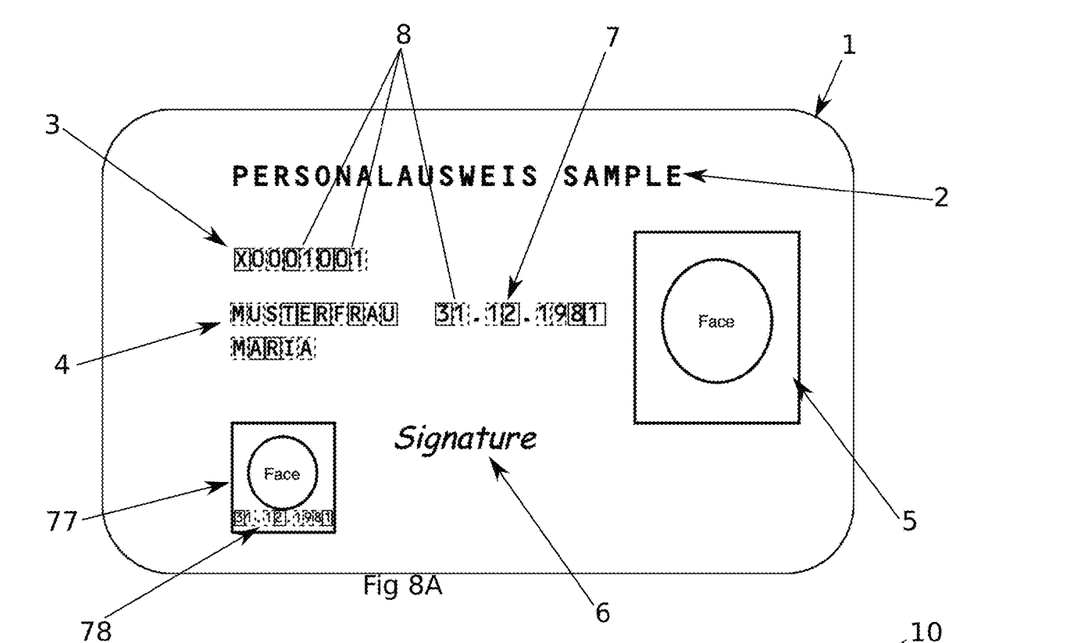
FIG. 8A schematically shows an unmodified image containing sensitive personal information including an additional face.

FIG. 8A shows an unmodified image 1 of a personal ID document similar to FIG. 1A. The same elements are indicated by the same reference signs and it is referred to the detailed description of FIG. 1A with regard to these elements. In contrast to FIG. 1A, the personal ID document imaged in FIG. 8A comprises an additional portrait 77 (i.e. an additional image of a face or, simply, an additional face). In this example, a copy of the date of birth 78 is arranged overlapping with the additional portrait 77. The additional portrait 77 is a modified version of the portrait 5, e.g. a holographic version of the portrait 5. The additional portrait 77 belongs to the sensitive personal information.

Figure 8B:
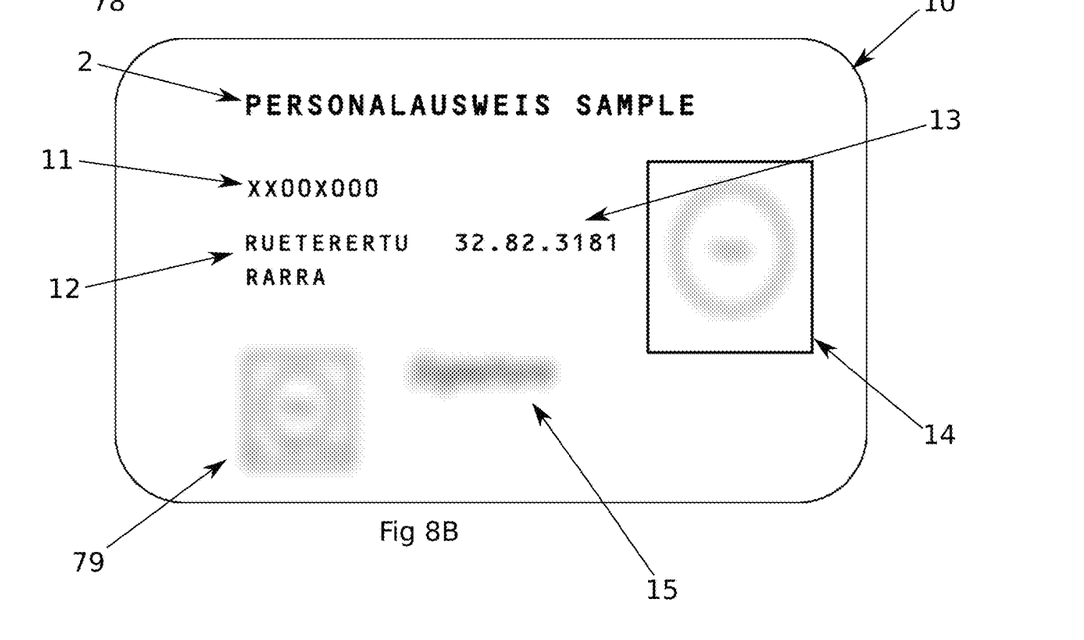
FIG. 8B schematically shows a modified image based on FIG. 8A after processing according to the present method.

FIG. 8B shows a modified image 10 of the same personal ID document as FIG. 8A after modification according to the method described in detail above, similar to FIG. 1B. Again, the same elements are indicated by the same reference signs and it is referred to the detailed description of FIG. 1B with regard to these elements. In contrast to FIG. 1B, the modified image 10 comprises a blurred version of the additional portrait 79, i.e. the section containing the additional portrait 77 is replaced by a blurred version of the additional portrait 79. Moreover, the blurred version of the additional portrait 79 also comprises a blurred version of the copy of the date of birth 78.

While the copy of the date of birth 78 is also part of the written information and may therefore be replaced by an anonymized version of the date of birth, similar to the anonymized version 13, the character sections may contain sensitive personal information due to the additional portrait 78 forming their background. Since the anonymization of written information according to the present method replaces only some character sections or changes only their arrangement and otherwise leaves the individual character sections intact (i.e. unmodified), the background within each character sections may also be replicated unmodified in the modified image 10. As a precaution, in such cases where multiple types of potentially sensitive personal information overlap, which types may be processed in different processing branches, the present method may be configured to prioritize the most destructive approach to anonymization. I.e. the result of the most destructive approach to anonymization prevails in the modified image 10.

In this example, the section comprising the character sections of the copy of the date of birth 78 is replaced by a version modified in a processing branch responsible for anonymizing face regions (e.g. the second branch 21 in the embodiment described above). Therefore, also any unselected character regions which may have been detected as part of the copy of the date of birth 78 and which would have passed another processing branch responsible for anonymizing sensitive text regions unmodified, are modified and effectively devaluated for purposes of training in favour of more reliable protection of sensitive personal information.

The invention claimed is:

1. A computer-implemented method for modifying image data, the method comprising:
   loading unmodified image data;
   detecting at least two alphanumeric characters in an image represented by the loaded image data;
   selecting one or more of the detected alphanumeric characters, wherein the number of selected alphanumeric characters is smaller than the total number of detected alphanumeric characters;
   modifying the loaded image data by removing one or more character sections of the loaded image data, wherein each character section corresponds to an area of a selected alphanumeric character;

modifying the loaded image data by shuffling one or more character sections of the loaded image data, wherein each character section corresponds to an area of an unselected alphanumeric character; and storing the modified image data.

2. The method of claim 1, wherein the number of selected alphanumeric characters is approximately half the number of all detected alphanumeric characters.

3. The method of claim 1, wherein:

detecting at least one word comprising two or more alphanumeric characters in the image represented by the loaded image data, selecting one or more of the detected alphanumeric characters of each detected word.

4. The method of claim 3, further comprising selecting approximately half the number of detected alphanumeric characters of each word.

5. The method of claim 1, further comprising:

modifying the loaded image data by replacing at least one of the removed character sections of the loaded image data with a character section of the loaded image data corresponding to an area of an unselected alphanumeric character.

6. The method of claim 3, further comprising:

modifying the loaded image data by replacing at least one of the removed character sections of the loaded image data belonging to the at least one word with a character section of the loaded image data corresponding to an area of an unselected alphanumeric character belonging to the same word as the removed character section.

7. The method of claim 3, wherein shuffling of character sections corresponding to alphanumeric characters belonging to the at least one word is limited to shuffling within the same word.

8. The method of claim 1, further comprising:

detecting at least one face in an image represented by the loaded image data;

modifying the loaded image data by removing one or more portrait sections of the loaded image data, wherein each portrait section corresponds to an area of a detected face.

9. The method of claim 8, wherein removing one or more portrait sections of the loaded image data comprises replacing at least one removed portrait section with a blurred version of the same portrait section.

10. The method of claim 8, further comprising:

detecting at least one additional face in an image represented by the loaded image data using the at least one detected face as a template;

modifying the loaded image data by removing one or more additional portrait sections of the loaded image data, wherein each additional portrait section corresponds to an area of a detected additional face.

11. The method of claim 10, wherein removing one or more additional portrait sections of the loaded image data comprises replacing at least one additional portrait section with a blurred version of the same additional portrait section.

12. The method of claim 1, further comprising:

detecting at least one written signature in an image represented by the loaded image data;

modifying the loaded image data by removing one or more signature sections of the loaded image data, wherein each signature section corresponds to an area of a detected written signature.

13. The method of claim 12, wherein removing one or more signature sections of the loaded image data comprises replacing at least one removed signature section with a blurred version of the same signature section.

14. The method of claim 1, further comprising:

detecting at least one machine-readable code in an image represented by the loaded image data;

modifying the loaded image data by removing one or more code sections of the loaded image data, wherein each code section corresponds to an area of a detected machine-readable code.

15. The method of claim 14, wherein removing one or more code sections of the loaded image data comprises replacing at least one removed code section with a blurred version of the same code section.

16. A data processing system comprising means for carrying out the method of claim 1.

17. A computer program product comprising instructions which, when the program is executed by a computer, cause the computer to carry out the method of claim 1.

18. A computer-implemented method for modifying image data, the method comprising:

loading unmodified image data;

detecting at least two alphanumeric characters in an image represented by the loaded image data;

selecting one or more of the detected alphanumeric characters, wherein the number of selected alphanumeric characters is smaller than the total number of detected alphanumeric characters;

detecting at least one word comprising two or more alphanumeric characters in the image represented by the loaded image data;

selecting one or more of the detected alphanumeric characters of each detected word;

selecting approximately half the number of detected alphanumeric characters of each word;

modifying the loaded image data by removing one or more character sections of the loaded image data, wherein each character section corresponds to an area of a selected alphanumeric character; and storing the modified image data.

19. The method of claim 18, further comprising:

modifying the loaded image data by replacing at least one of the removed character sections of the loaded image data belonging to the at least one word with a character section of the loaded image data corresponding to an area of an unselected alphanumeric character belonging to the same word as the removed character section.

20. The method of claim 18, wherein the number of selected alphanumeric characters is approximately half the number of all detected alphanumeric characters.

* * * * *